US012679239B2

(12) United States Patent
Clausin et al.

(10) Patent No.: US 12,679,239 B2
(45) Date of Patent: Jul. 14, 2026

(54) ELECTRICAL POWER SUPPLY SYSTEM FOR A VEHICLE

(71) Applicant: SCHAEFFLER TECHNOLOGIES AG & CO. KG, Herzogenaurach (DE)

(72) Inventors: Renaud Clausin, Toulouse (FR); Aurélien Fremeaux, Toulouse (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/156,144

(22) PCT Filed: Apr. 10, 2024

(86) PCT No.: PCT/EP2024/059654
§ 371 (c)(1),
(2) Date: Aug. 13, 2025

(87) PCT Pub. No.: WO2024/213559
PCT Pub. Date: Oct. 17, 2024

(65) Prior Publication Data
US 2026/0116233 A1 Apr. 30, 2026

(30) Foreign Application Priority Data

Apr. 12, 2023 (FR) ...................................... 2303610

(51) Int. Cl.
*B60L 53/60* (2019.01)
*B60L 50/64* (2019.01)
*B60L 53/16* (2019.01)

(52) U.S. Cl.
CPC ............... *B60L 53/60* (2019.02); *B60L 50/64* (2019.02); *B60L 53/16* (2019.02)

(58) Field of Classification Search
None
See application file for complete search history.

(56) References Cited

U.S. PATENT DOCUMENTS

| | | | |
|---|---|---|---|
| 10,804,793 B2 | 10/2020 | Masich et al. | |
| 2010/0327823 A1* | 12/2010 | Nisenblat | H02J 3/1828 |
| | | | 323/206 |

(Continued)

FOREIGN PATENT DOCUMENTS

| | | | |
|---|---|---|---|
| CN | 205693405 U | * | 11/2016 |
| EP | 3086437 A1 | | 10/2016 |

(Continued)

OTHER PUBLICATIONS

International Search Report (PCT/ISA/210) with translation and Written Opinion (PCT/ISA/237) with machine translation mailed on Jun. 25, 2024 by the European Patent Office as the International Searching Authority for International Application No. PCT/EP2024/059654. (19 pages).

*Primary Examiner* — Ryan Johnson
*Assistant Examiner* — Aqeel H Bukhari
(74) *Attorney, Agent, or Firm* — Buchanan Ingersoll & Rooney PC

(57) ABSTRACT

A method for managing the use of an on-board motor vehicle battery charger. The vehicle including a supply battery, the on-board charger being connected, on the one hand, to the battery and being intended to be connected, on the other hand, to an electrical power supply network that is external to the vehicle and is able to provide a three-phase voltage. Each network phase is characterized by a maximum overall usage power. The on-board charger includes a plurality of conversion modules, each conversion module includes a plurality of elementary power conversion units that are independent of one another. Each elementary unit being characterized by a maximum usage power threshold. Each conversion module being intended to be connected to an external power supply network phase.

5 Claims, 4 Drawing Sheets

(56)                    References Cited

U.S. PATENT DOCUMENTS

| | | | | |
|---|---|---|---|---|
| 2011/0149622 | A1* | 6/2011 | Lin | H02M 1/4208 363/124 |
| 2013/0314038 | A1* | 11/2013 | Kardolus | H02J 7/02 320/109 |
| 2015/0357937 | A1 | 12/2015 | Takahara et al. | |
| 2017/0274792 | A1* | 9/2017 | Vaughan | B60L 53/14 |
| 2020/0366116 | A1 | 11/2020 | Yang | |
| 2021/0288495 | A1 | 9/2021 | Mcnamara et al. | |
| 2022/0021293 | A1* | 1/2022 | Esmoris Bertoa | H02M 1/10 |

FOREIGN PATENT DOCUMENTS

| | | | |
|---|---|---|---|
| EP | 3175530 | B1 | 5/2018 |
| JP | 2013048534 | A * | 3/2013 |

* cited by examiner

| | A | B | C | D | E | F | G | H | I |
|---|---|---|---|---|---|---|---|---|---|
| N° | 9 | 8 | 3 | 6 | 5 | 2 | 7 | 1 | 4 |

ELECTRICAL POWER SUPPLY SYSTEM FOR A VEHICLE

CROSS-REFERENCE TO RELATED APPLICATIONS

This application is the U.S. National Phase Application of PCT International Application No. PCT/EP2024/059654, filed Apr. 10, 2024, which claims priority to French Patent Application No. FR2303610, filed Apr. 12, 2023, the contents of such applications being incorporated by reference herein.

FIELD OF THE INVENTION

The invention relates to the field of hybrid or electric vehicles, and more specifically to a method for managing the use of the different charging modules of an on-board motor vehicle charger.

BACKGROUND OF THE INVENTION

In a known manner, an electric or hybrid vehicle comprises an on-board charger that allows the vehicle battery or batteries to be recharged. More specifically, the on-board charger comprises a power factor corrector, more commonly known as a PFC, which allows the output voltage of the on-board charger to be regulated.

The power factor corrector, PFC, comprises three power conversion modules. In addition, each conversion module comprises a plurality of elementary power conversion units that are independent of one another. Each elementary unit is more commonly referred to as a "bank" by a person skilled in the art.

Each conversion module is intended to be connected to a phase of a power supply network that is external to the vehicle. For a given conversion module, the number of elementary power conversion units activated depends on the power required by the battery in order for said battery to be recharged. In this case, the activation order of the elementary units is predefined. The consequence of this is that the elementary units of each conversion module of the power factor corrector, PFC, are not used uniformly. In other words, by extension, each elementary unit ages differently and therefore the set of elementary conversion units does not wear uniformly either.

There is therefore the need for a solution which makes it possible to overcome, at least in part, the drawbacks described above.

SUMMARY OF THE INVENTION

To this end, an aspect of the invention relates to a method for managing the use of an on-board motor vehicle battery charger, the vehicle comprising a supply battery, the on-board charger being connected, on the one hand, to said battery and being intended to be connected, on the other hand, to an electrical power supply network that is external to the vehicle and is able to provide a three-phase voltage, each network phase is characterized by a maximum overall usage power, the on-board charger comprises a plurality of conversion modules, each conversion module comprises a plurality of elementary power conversion units that are independent of one another, each elementary unit being characterized by a maximum usage power threshold, each conversion module being intended to be connected to an external power supply network phase, the method comprising the steps of:

a) determining the electrical energy that has passed through each elementary unit since the start of the use of said elementary unit, b) determining the activation order of the elementary units by ordering the different elementary units from the one having had the least amount of electrical energy passed through it to the one having had the most electrical energy passed through it, c) determining the power value to be provided by each conversion module on the basis of the voltage that each electrical power supply network phase is able to provide and the maximum overall usage power of each network phase, d) allocating a maximum power value to each elementary unit from the previously determined list on the basis of:
      i) the determined activation order,
      ii) the maximum usage power threshold of each elementary unit,
      iii) the maximum overall usage power of each network phase, e) determining the instantaneous overall power that the on-board charger has to provide, f) activating the elementary units on the basis of:
      i) the power allocated to each elementary unit,
      ii) the instantaneous overall power that the on-board charger has to provide.

The method thus presented allows the power used by the on-board charger to be adapted on the basis of the power that each network phase is able to provide. In addition, this method also allows the ageing of the elementary units to be distributed by first using the least used elementary units, since these are the elementary units through which the least amount of power passes. It is therefore not always the same elementary units that are used.

Preferably, during the allocation step, the power allocated to each elementary unit is defined as follows: for each elementary unit and following the activation order of the elementary units, the allocated power is:

a) equal to the difference between the maximum overall usage power of the phase connected to said conversion module and the value of the sum of the powers allocated to the other elementary units of the same conversion module, b) and defined so as to be less than or equal to the maximum usage power threshold.

In this way, the power allocated to each elementary unit depends on the usage limits and thresholds of each elementary unit and depends on the power that each network phase is able to provide.

More preferably, during the activation step, the elementary units to be activated are chosen by selecting, following the activation order, the minimum number of elementary units for which the sum of the maximum allocated powers is greater than or equal to the instantaneous power.

The elementary units are therefore not activated systematically, but rather are activated only when this is necessary to provide the necessary instantaneous power.

An aspect of the invention also relates to a power supply system for a motor vehicle, comprising:

a) a supply battery, b) an on-board charger being connected, on the one hand, to said battery and being intended to be connected, on the other hand, to an electrical power supply network that is external to the vehicle and is able to provide a three-phase voltage, each network phase is character-
ized by a maximum overall usage power, the on-board
charger comprises a plurality of conversion modules,
each conversion module comprises a plurality of
elementary power conversion units that are indepen-
dent of one another, each elementary unit being char-
acterized by a maximum usage power threshold, each
conversion module being intended to be connected to
an external power supply network phase, c) a control unit able to implement the method as pre-
sented above.

Finally, an aspect of the invention relates to a motor
vehicle comprising a power supply system as presented
above.

BRIEF DESCRIPTION OF THE DRAWINGS

Further features and advantages of aspects of the inven-
tion will become more clearly apparent upon reading the
following description. This description is purely illustrative
and should be read with reference to the attached drawings,
in which.

DETAILED DESCRIPTION OF EXEMPLARY EMBODIMENTS

Usually, a vehicle comprises an electric battery that is
configured to supply power to various items of electrical
equipment of the vehicle. In order to recharge said electric
battery, the vehicle comprises an on-board charger.

More specifically, the on-board charger comprises a
power factor corrector, more commonly referred to as a
PFC, and a control unit.

Figure 1:
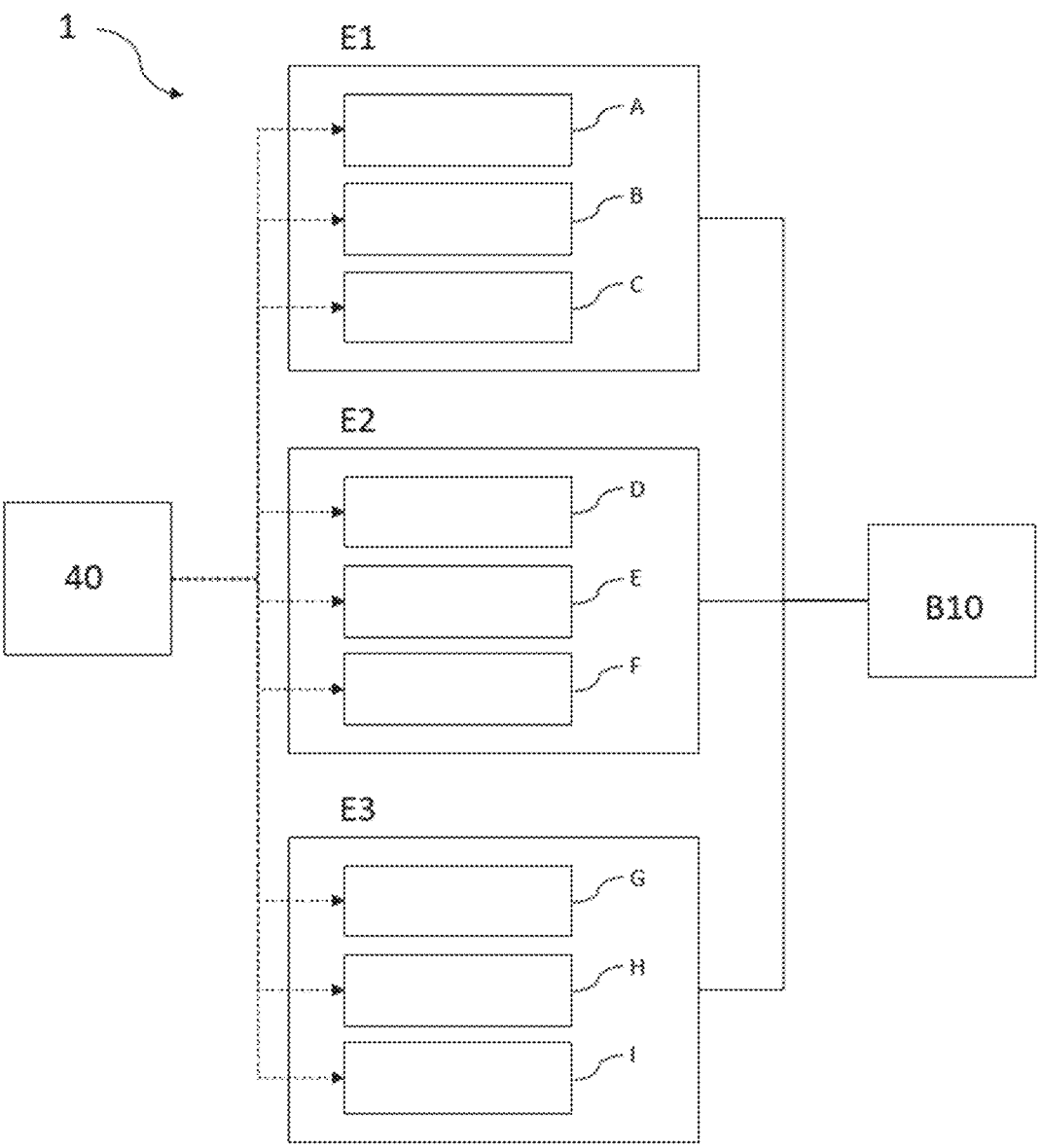
FIG. 1 is a schematic representation of the on-board
charger according to an aspect of the invention.

With reference to FIG. 1, the power factor corrector 1 of
the on-board charger is intended to be electrically connected
to a recharging terminal B10 that is external to the vehicle.
The recharging terminal B10 is connected to an electrical
power supply network that is external to the vehicle. The
external power supply network corresponds to a three-phase
voltage; each phase of said voltage does not necessarily
provide the same voltage level. In other words, the power
provided by each of the phases is limited by a maximum
overall usage power $P_{max}$. For example, the first phase is
able to provide 8 kW, the second phase is not able to provide
any power (0 kW), and the third phase is able to provide 6
kW.

The power factor corrector 1 allows the voltage provided
by said network of the recharging terminal B10 to be
converted in order to recharge the battery of the vehicle.

By way of clarification, the type of recharging terminal
presented here may be known to a person skilled in the art
as "EVSE" (electrical vehicle supply equipment).

For this purpose, the power factor corrector 1 comprises
a plurality of power conversion modules, in other words a
plurality of stages. According to the example presented in
FIG. 1, the corrector comprises three power conversion
modules E1, E2, E3. Each power conversion module E1, E2,
E3 is intended to be connected to one phase of the voltage
provided by the power supply network.

Each power conversion module E1, E2, E3 comprises a
plurality of elementary power conversion units A, B, C, D,
E, F, G, H, I that are commonly referred to as "banks" by a
person skilled in the art and are independent of one another.
According to the example presented here, each conversion
module E1, E2, E3 comprises three elementary units. The
first conversion module E1, which is intended to be con-
nected to a first phase of the external electrical power supply
network, comprises three elementary units A, B, C, the
second stage E2, which is intended to be connected to a
second phase of the external electrical power supply net-
work, comprises three charging modules D, E, F, and the
third stage E3, which is intended to be connected to a third
phase of the external electrical power supply network,
comprises three charging modules G, H, I.

Each elementary unit A, B, C, D, E, F, G, H, I is
characterized by a maximum usage power threshold $S_{max}$.
Usually, the maximum threshold $S_{max}$ is identical for all of
the elementary units A, B, C, D, E, F, G, H, I. By way of
example, the maximum threshold $S_{max}$ is equal to 3.6 kW for
each elementary unit A, B, C, D, E, F, G, H, I.

The control unit, which is represented by the reference 40,
is connected to each elementary unit A, B, C, D, E, F, G, H,
I and is able to control each elementary unit A, B, C, D, E,
F, G, H, I. More specifically, the control unit is configured
to define the elementary units A, B, C, D, E, F, G, H, I of
each conversion module E1, E2, E3 that are to be activated,
and the power provided by each of the activated elementary
units A, B, C, D, E, F, G, H, I.

The control unit 40 is also configured to obtain, in other
words to recover, the value of the maximum overall usage
power $P_{max}$ of each phase of the recharging terminal B10.

More specifically, the control unit 40 is configured to:

a. determine, for each elementary unit A, B, C, D, E, F, G,
H, I, the electrical energy that has passed through said
elementary unit A, B, C, D, E, F, G, H, I during the
service life of said elementary unit A, B, C, D, E, F, G,
H, I, b. determine the activation order of the elementary units
A, B, C, D, E, F, G, H, I by ordering the different
elementary units from the one having had the least
amount of electrical energy passed through it to the one
having had the most electrical energy passed through it;
each elementary unit A, B, C, D, E, F, G, H, I is
therefore associated with a rank, c. determine the power value to be provided by each
conversion module E1, E2, E3 on the basis of the
voltage that each electrical power supply network
phase is able to provide and the maximum overall
usage powers $P_{max}$ of each phase of the voltage pro-
vided by the recharging terminal B10, d. allocate a power value to be provided to each elemen-
tary unit A, B, C, D, E, F, G, H, I from the previously
determined list on the basis of:

i. the determined activation order, ii. the maximum usage power threshold $S_{max}$ of each
elementary unit A, B, C, D, E, F, G, H, I, iii. the power value to be provided by each conversion module E1, E2, E3.

On the basis of the power allocated to each elementary unit A, B, C, D, E, F, G, H, I and the instantaneous consumption, in other words the power consumed by the vehicle battery, the control unit 40 is configured to control the activation or non-activation of the elementary units A, B, C, D, E, F, G, H, I. This will be explained in greater detail in the description of the method below.

Method

Figures 2, 3:
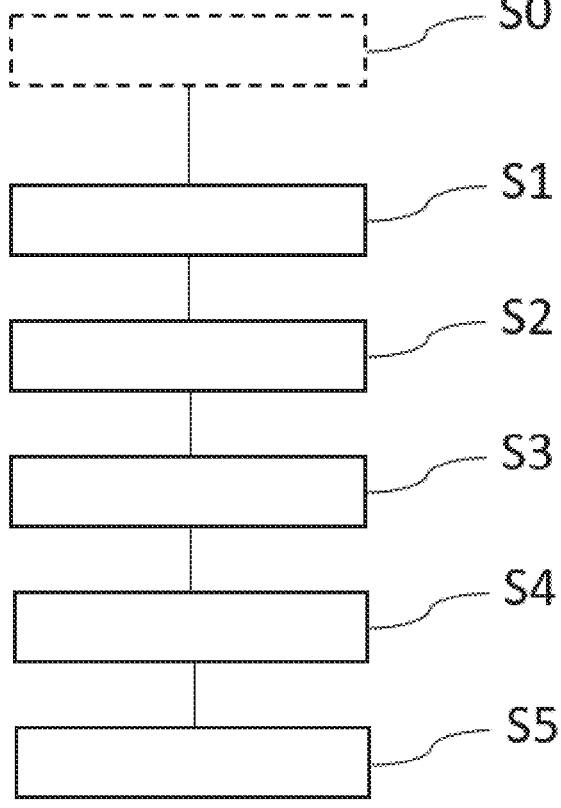
FIG. 2 is a schematic representation of a method for
managing the use of an on-board charger according to FIG.
1, and more specifically a method for managing the activa-
tion of the elementary units of a power factor corrector of an
on-board charger according to FIG. 1.
FIG. 3 shows, in a table, the activation order of the
elementary units A, B, C, D, E, F, G, H, I obtained after
implementing the determination step S2 of the method
according to FIG. 2.
Figure 4:
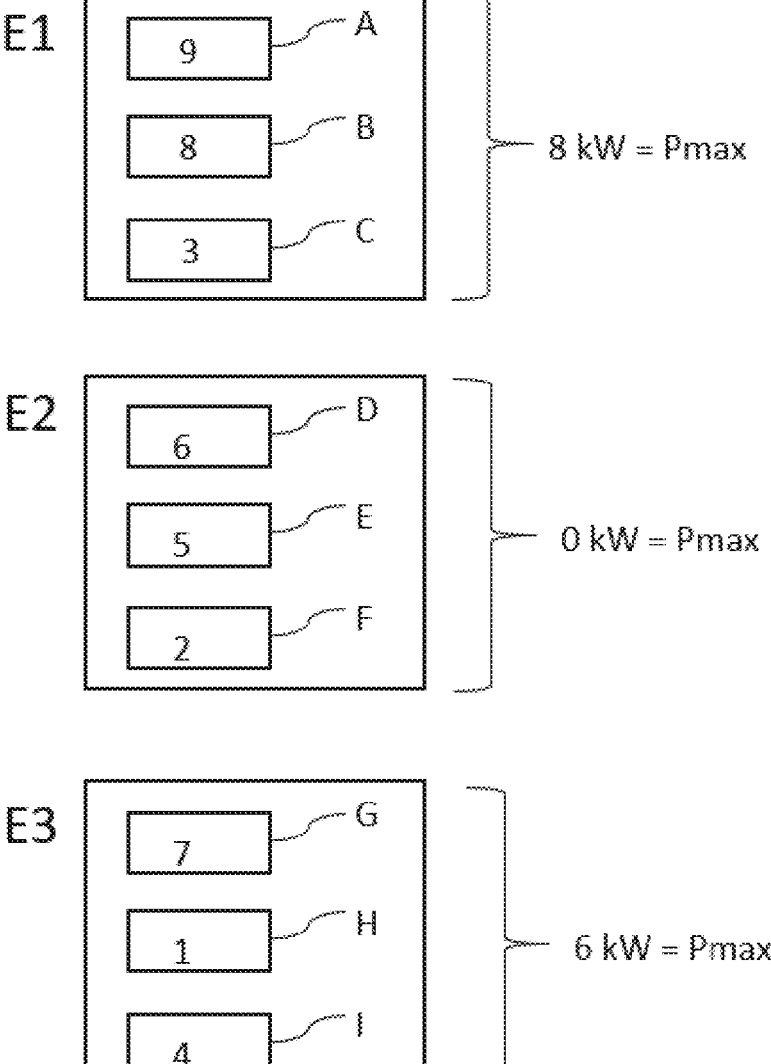
FIG. 4 shows, in a table, the power provided by each
phase of an electrical power supply network to each con-
version module of the power factor corrector of the on-board
charger according to FIG. 1.

With reference to FIGS. 2 to 5, the method for managing the use of an on-board charger, as described above, will now be presented in detail. The method according to FIG. 2 is in particular described in the case where a recharging terminal B10 is connected to the power factor corrector. The method is implemented by the control unit 40 as described above.

For this purpose, each phase of the recharging terminal B10 is connected beforehand to a conversion module E1, E2, E3 during a preliminary step S0.

The method first of all comprises a step S1 of determining the electrical energy that has passed through each elementary unit A, B, C, D, E, F, G, H, I during the service life thereof.

For this purpose, a voltage and current measurement is carried out in order to determine the power in kilojoules for each elementary unit A, B, C, D, E, F, G, H, I. The set of measurements may be received or measured directly by the control unit 40.

The method then comprises a step S2 of determining the activation order of the elementary units A, B, C, D, E, F, G, H, I by ordering the different elementary units A, B, C, D, E, F, G, H, I from the one having had the least amount of electrical energy pass through it (rank 1) to the one having had the most electrical energy pass through it (rank 9). With reference to FIG. 3, the activation order, in other words rank, associated with each elementary unit A, B, C, D, E, F, G, H, I obtained following the determination step S2 is shown in a table. This step therefore allows an activation list of the elementary units A, B, C, D, E, F, G, H, I to be created on the basis of the energy passed through each elementary unit A, B, C, D, E, F, G, H, I.

The method also comprises a step S3 of determining the power value to be provided by each conversion module E1, E2, E3 according to the maximum overall usage power $P_{max}$ that each electrical power supply network phase is able to provide. Specifically, in the present case, each phase of the recharging terminal B10 does not provide the same power. Therefore, with reference to FIG. 4, it may be determined, for example, that the first conversion module E1 obtains a maximum of 8 kW from the first phase of the recharging terminal B10, the second conversion module E2 does not obtain any power from the second phase of the recharging terminal B10, and the third conversion module E3 obtains a maximum of 6 kW from the third phase of the recharging terminal B10.

The method then comprises a step S4 of allocating a maximum power value to each conversion unit A, B, C, D, E, F, G, H, I from the previously determined list on the basis of:

a. the activation order in the list, b. the maximum usage power threshold $S_{max}$ of each elementary unit A, B, C, D, E, F, G, H, I, c. the value of the power provided by each phase to its own conversion module E1, E2, E3 (in other words the maximum overall usage powers $P_{max}$ of each phase of the voltage provided by the recharging terminal B10).

First of all, the allocation step S4 comprises an initialization step, during which the set of allocated power values is defined at 0 kW.

Then, the power allocated to each elementary unit A, B, C, D, E, F, G, H, I is defined in the following way: for each elementary unit A, B, C, D, E, F, G, H, I and according to the determined activation order of the elementary units A, B, C, D, E, F, G, H, I, the maximum allocated power is:

a. equal to the difference between the maximum overall usage power $P_{max}$ of the phase connected to said conversion module E1, E2, E3 and the value of the sum of the powers allocated to the other elementary units A, B, C, D, E, F, G, H, I of the same conversion module E1, E2, E3, b. and defined so as to be less than or equal to the maximum usage power threshold $S_{max}$.

Figure 5:
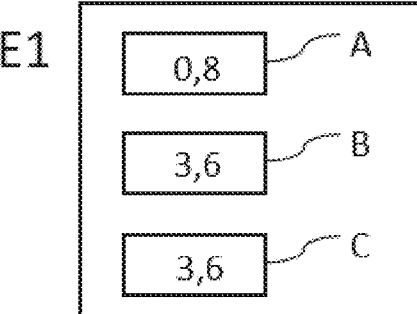
FIG. 5 shows, in a table, the maximum power allocated to
each elementary unit A, B, C, D, E, F, G, H, I of the power
factor corrector of the on-board charger according to FIG. 1.
Figure 5:
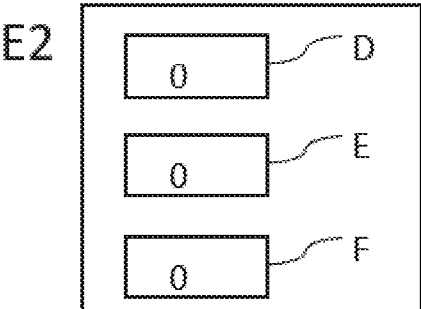
Figure 5:
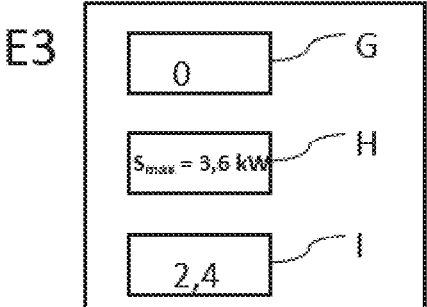

With reference to FIG. 5, the maximum power allocated to each elementary unit A, B, C, D, E, F, G, H, I is shown.

In particular here, since no power is provided to the second conversion module E2 by the second phase of the power supply network, the power allocated to each elementary unit D, E, F of the second conversion module E2 remains at the power value allocated during the preliminary initialization step S0, in other words: at 0 kW.

Consideration is then given to the elementary unit H, which is the first in the activation list. The maximum power thus allocated to said elementary unit H is equal to the maximum threshold $S_{max}$, and therefore to 3.6 kW in the example presented here.

The calculated maximum allocated power then corresponds to that of the elementary unit C, which is in the third activation rank (the maximum power allocated to the elementary unit F in the second activation rank has already been defined at 0 kW). The power allocated to the elementary unit C is equal to the maximum threshold $S_{max}$, and therefore to 3.6 kW in the example presented here.

Subsequently, the maximum allocation power of the elementary unit I (defined at activation rank 4) is calculated by carrying out the following calculation: 6 kW–3.6 kW–0 kW=2.4 kW.

The maximum allocation power of the elementary unit G, defined at activation rank 7, is then calculated (the charging modules E and D are at activation rank 5 and 6, respectively, but their allocated power has already been defined at 0 kW), by carrying out the following calculation: 6 kW–3.6 kW–2.4 kW=0 kW. In other words, the elementary units H and I together already provide the maximum power available for the third conversion module E3.

The maximum power allocated to the elementary unit B (defined at activation rank 8) is then determined by carrying out the following calculation: 8 kW–3.6 kW–0 kW=4.4 kW. However, the maximum allocated power has to be less than or equal to the maximum threshold $S_{max}$, and therefore less than or equal to 3.6 kW. Therefore, the maximum power allocated to the elementary unit B is defined at 3.6 kW.

Finally, the maximum allocated power for the elementary unit A (at activation rank 9) is determined, for which the maximum allocated power is calculated in the following way: 8 kW–3.6 kW–3.6 kW=0.8 kW.

The method then comprises a step S5 of activating the charging modules A, B, C, D, E, F, G, H, I on the basis of:

a. the maximum power allocated to each elementary unit A, B, C, D, E, F, G, H, I, b. the instantaneous power, corresponding to the power consumed by the vehicle battery, in other words the power that has to be provided by the power factor corrector PFC to compensate for the battery consumption.

More specifically, during the activation step S5, only some elementary units A, B, C, D, E, F, G, H, I are activated. The elementary units A, B, C, D, E, F, G, H, I to be activated are chosen by selecting, following the activation order, the minimum number of elementary units A, B, C, D, E, F, G, H, I for which the sum of the allocated powers is greater than or equal to the instantaneous power.

For example, if the instantaneous power is equal to 8 kW, then the elementary units A, B, C, D, E, F, G, H, I to be activated will correspond to the elementary units H, C, and I (because the sum of the maximum powers allocated to these elementary units is equal to 9.6 kW).

For example again, if the instantaneous power is equal to 10 kW, then it will not be sufficient to activate the elementary units H, C and I. It will also be necessary to activate the next elementary unit in the activation list: here corresponding to the elementary unit B (for which the maximum allocated power is 3.6 kW).

Therefore, the maximum power allocation for each elementary unit A, B, C, D, E, F, G, H, I depends on the power having passed through each elementary unit A, B, C, D, E, F, G, H, I. The power having passed through each elementary unit A, B, C, D, E, F, G, H, I makes it possible to represent the "ageing", in other words the usage rate, of each elementary unit A, B, C, D, E, F, G, H, I. The activation of each elementary unit A, B, C, D, E, F, G, H, I therefore depends on the ageing of each elementary unit A, B, C, D, E, F, G, H, I.

This therefore makes it possible to balance and even out the use of the set of elementary units A, B, C, D, E, F, G, H, I on the whole. In other words, it is not always the same elementary units A, B, C, D, E, F, G, H, I that are called upon to be used. This makes it possible to prevent premature ageing of some or all of the elementary units A, B, C, D, E, F, G, H, I.

The invention claimed is:

1. A method for managing the use of an on-board motor vehicle battery charger, the vehicle comprising a supply battery, the on-board charger being connected, on the one hand, to said battery and being intended to be connected, on the other hand, to an electrical power supply network that is external to the vehicle and is able to provide a three-phase voltage, each network phase is characterized by a maximum overall usage power, the on-board charger comprises a plurality of conversion modules, each conversion module comprises a plurality of elementary power conversion units that are independent of one another, each elementary unit being characterized by a maximum usage power threshold, each conversion module being intended to be connected to an external power supply network phase, the method comprising:
    a) determining the electrical energy that has passed through each elementary unit since the start of the use of said elementary unit,
    b) determining the activation order of the elementary units by ordering the different elementary units from the one having had the least amount of electrical energy passed through it to the one having had the most electrical energy passed through it,
    c) determining the power value to be provided by each conversion module on the basis of the voltage that each electrical power supply network phase is able to provide and the maximum overall usage power of each network phase,
    d) allocating a maximum power value to each elementary unit from the previously determined list on the basis of:
      i) the determined activation order,
      ii) the maximum usage power threshold of each elementary unit
      iii) the maximum overall usage power of each network phase,
    e) determining the instantaneous overall power that the on-board charger has to provide,
    f) activating the elementary units on the basis of:
      i) the power allocated to each elementary unit,
      ii) the instantaneous overall power that the on-board charger has to provide.

2. The method as claimed in claim 1, wherein, during the allocation step, the power allocated to each elementary unit is defined as follows: for each elementary unit and following the activation order of the elementary units, the allocated power is:
    a) equal to the difference between the maximum overall usage power of the phase connected to said conversion module and the value of the sum of the powers allocated to the other elementary units of the same conversion module,
    b) and defined so as to be less than or equal to the maximum usage power threshold.

3. The method as claimed in claim 2, wherein, during the activation step, the elementary units to be activated are chosen by selecting, following the activation order, the minimum number of elementary units for which the sum of the maximum allocated powers is greater than or equal to the instantaneous power.

4. A power supply system for a motor vehicle, comprising:
    a) a supply battery,
    b) an on-board charger being connected, on the one hand, to said battery and being intended to be connected, on the other hand, to an electrical power supply network that is external to the vehicle and is able to provide a three-phase voltage, each network phase is characterized by a maximum overall usage power, the on-board charger comprises a plurality of conversion modules, each conversion module comprises a plurality of elementary power conversion units that are independent of one another, each elementary unit being characterized by a maximum usage power threshold, each conversion module being intended to be connected to an external power supply network phase,
    c) a control unit able to implement the method as claimed in claim 1.

5. A motor vehicle comprising a power supply system as claimed in claim 4.

* * * * *